United States Patent
Eichhorn et al.

(10) Patent No.: US 10,814,753 B2
(45) Date of Patent: Oct. 27, 2020

(54) ADJUSTING DEVICE OF A LUMBAR SUPPORT OR OF A SIDE-BOLSTER ADJUSTER HAVING A SPINDLE DRIVE FOR A SEAT ELEMENT OF A VEHICLE SEAT

(71) Applicant: Brose Fahrzeugteile GmbH & Co. Kommanditgesellschaft, Coburg, Coburg (DE)

(72) Inventors: Sebastian Eichhorn, Oberweißbach/OT Lichtenhain (DE); Florian Schmieder, Coburg (DE); Wera Wolniczak, Grub am Forst (DE)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 0 days.

(21) Appl. No.: 16/335,185

(22) PCT Filed: Sep. 27, 2017

(86) PCT No.: PCT/EP2017/074438
§ 371 (c)(1),
(2) Date: Mar. 20, 2019

(87) PCT Pub. No.: WO2018/060219
PCT Pub. Date: Apr. 5, 2018

(65) Prior Publication Data
US 2019/0344692 A1    Nov. 14, 2019

(30) Foreign Application Priority Data

Sep. 30, 2016  (DE) .................... 10 2016 219 104

(51) Int. Cl.
*B60N 2/62*  (2006.01)
*B60N 2/64*  (2006.01)
(Continued)

(52) U.S. Cl.
CPC ............... *B60N 2/66* (2013.01); *B60N 2/929* (2018.02); *B60N 2/99* (2018.02)

(58) Field of Classification Search
CPC ............. B60N 2/66; B60N 2/929; B60N 2/99
(Continued)

(56) References Cited

U.S. PATENT DOCUMENTS 2,139,028 A  12/1938 Mensendicck et al.
3,596,990 A   8/1971 Gottfried et al.
(Continued)

FOREIGN PATENT DOCUMENTS

DE         10152556 C1   10/2002
DE      102004008230 B3   10/2005
(Continued)

*Primary Examiner* — Rodney B White
(74) *Attorney, Agent, or Firm* — Lewis Roca Rothgerber Christie LLP

(57) ABSTRACT

It is provided an adjusting device of a lumbar support or a side-bolster adjuster for changing the contour or position of a seat element of a vehicle seat supporting a body part of a seat user, with at least one driving device comprising a spindle drive and at least one adjustable support element for changing the contour or position of the seat element, wherein the spindle drive comprises a spindle extending along a spindle axis, which on a fastening part of the lumbar support or the side-bolster adjuster mounted in the vehicle seat is floatingly mounted at a spindle end via a spindle holder such that at this spindle end the spindle is displaceable along at least one spatial direction extending transversely to the spindle axis.

18 Claims, 7 Drawing Sheets

(51) Int. Cl.
*B60N 2/66* (2006.01)
*B60N 2/90* (2018.01)

(58) Field of Classification Search
USPC .............................. 297/284.4, 284.7, 284.9
See application file for complete search history.

(56) References Cited

U.S. PATENT DOCUMENTS

| | | | | |
|---|---|---|---|---|
| 4,915,448 | A * | 4/1990 | Morgenstern | A47C 7/462 |
| | | | | 297/284.7 |
| 7,131,695 | B2 * | 11/2006 | Hofschulte | B60N 2/0232 |
| | | | | 297/284.9 |
| 8,091,967 | B2 * | 1/2012 | Schweizer | B60N 2/0232 |
| | | | | 297/284.7 |
| 8,360,523 | B2 * | 1/2013 | Maierhofer | A47C 7/465 |
| | | | | 297/284.4 |
| 8,991,923 | B2 * | 3/2015 | Maierhofer | A47C 7/465 |
| | | | | 297/284.4 |
| 9,193,287 | B2 * | 11/2015 | McMillen | B60N 2/02 |
| 9,555,727 | B2 * | 1/2017 | Kotz | B60N 2/888 |
| 2003/0075963 | A1 | 4/2003 | Oberbeck | |
| 2004/0089784 | A1 | 5/2004 | Garrido | |
| 2005/0150317 | A1 | 7/2005 | Desquesne et al. | |
| 2007/0068301 | A1 * | 3/2007 | Hoch | F16H 55/06 |
| | | | | 74/425 |
| 2008/0196524 | A1 * | 8/2008 | Oberle | B60N 2/929 |
| | | | | 74/89.34 |
| 2008/0196965 | A1 * | 8/2008 | Oberle | B60N 2/0224 |
| | | | | 180/384 |
| 2009/0026821 | A1 * | 1/2009 | Macht | B60N 2/986 |
| | | | | 297/284.9 |
| 2010/0066143 | A1 * | 3/2010 | Schweizer | B60N 2/666 |
| | | | | 297/284.7 |
| 2010/0066144 | A1 | 3/2010 | Schweizer et al. | |
| 2011/0266849 | A1 * | 11/2011 | Schwarze | B60N 2/0232 |
| | | | | 297/284.1 |
| 2013/0229042 | A1 * | 9/2013 | Kotz | B60N 2/829 |
| | | | | 297/391 |
| 2014/0125102 | A1 * | 5/2014 | McMillen | B60N 2/02 |
| | | | | 297/284.4 |
| 2015/0007676 | A1 | 1/2015 | Schroeder et al. | |
| 2018/0029508 | A1 * | 2/2018 | Carl | B60N 2/929 |
| 2018/0154812 | A1 * | 6/2018 | McMillen | B60N 2/02 |
| 2019/0143848 | A1 | 5/2019 | Andres et al. | |

FOREIGN PATENT DOCUMENTS

| | | |
|---|---|---|
| DE | 102004020116 A1 | 11/2005 |
| DE | 202006013434 U1 | 11/2006 |
| DE | 102006008235 A1 | 8/2007 |
| DE | 202006012434 U1 | 2/2008 |
| DE | 202006013423 U1 | 2/2008 |
| DE | 102006049808 A1 | 4/2008 |
| DE | 102008047248 A1 | 3/2010 |
| DE | 102010061788 A1 | 5/2012 |
| DE | 102011004143 A1 | 8/2012 |
| DE | 102011075514 A1 | 11/2012 |
| DE | 102012104559 A1 | 11/2013 |
| DE | 112014003134 T5 | 4/2016 |
| DE | 102016207620 A1 | 11/2017 |
| EP | 1566118 B1 | 5/2008 |
| EP | 2322058 A1 | 5/2019 |
| FR | 2860457 | 4/2005 |
| GB | 2226238 A | 6/1990 |
| JP | 2010057824 A | 3/2010 |
| WO | WO 03/031222 A1 | 4/2003 |
| WO | WO 2007/096141 A1 | 8/2007 |
| WO | WO 2015/113633 A1 | 8/2015 |

\* cited by examiner

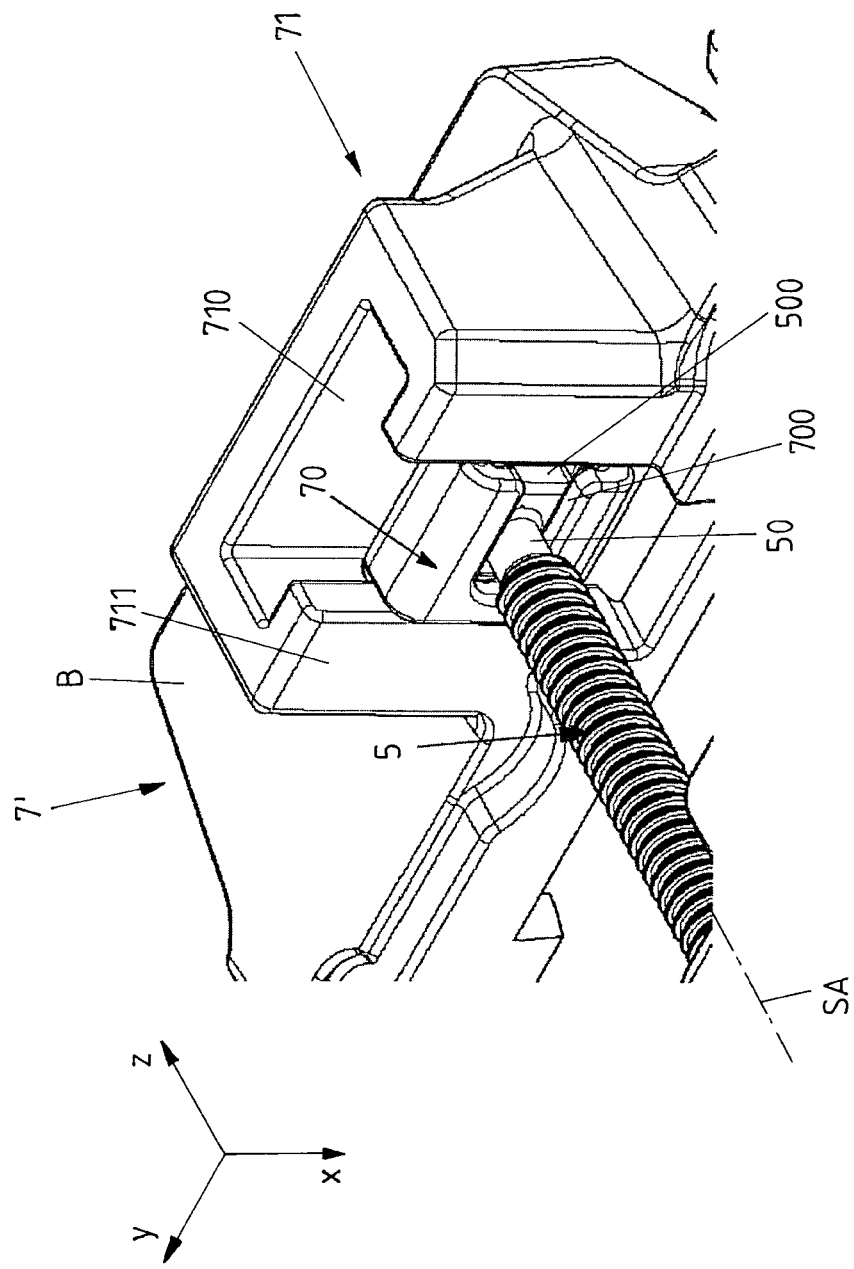

ADJUSTING DEVICE OF A LUMBAR SUPPORT OR OF A SIDE-BOLSTER ADJUSTER HAVING A SPINDLE DRIVE FOR A SEAT ELEMENT OF A VEHICLE SEAT

CROSS-REFERENCE TO A RELATED APPLICATION

This application is a U.S. Phase Patent Application and claims priority to and the benefit of International Patent Application Number PCT/EP2017/074438, filed on Sep. 27, 2017, which claims priority of German Patent Application Number 10 2016 219 104.7, filed on Sep. 30, 2016, the entire contents of all of which are incorporated herein by reference.

BACKGROUND

The disclosure relates to an adjusting device of a lumbar support or a side-bolster adjuster for changing the contour or position of a seat element of a vehicle seat supporting a body part of a seat user.

The adjusting device for example serves to variably change the shape of a support region or a side bolster of a seat underpart, a backrest or a headrest of a vehicle seat by means of at least one support element of the adjusting device. In particular, the adjusting device can be equipped or provided for the adjustment of the convexity and/or width of lateral support regions or side bolsters of a seat underpart or a backrest, of a support region of an upper backrest part of a divided backrest in the shoulder and head region of a vehicle occupant, of a headrest, of a lumbar support in the lumbar vertebrae region of a vehicle occupant or of a thigh rest of a seat underpart. The adjusting device can be of modular construction and in this way be used for different adjusting functions as well as sizes and types of seat elements.

What is part of a generic adjusting device is at least one driving device including a spindle drive. Via a spindle drive for example the at least one support element can be adjusted for variably acting on the respective seat element and/or its position on the vehicle seat can be adjusted. From EP 2 322 058 A1 for example an adjusting device for a lumbar support is known, which is provided with a spindle drive.

In adjusting devices for a seat element of a vehicle seat comprising a spindle drive with a rigidly mounted spindle or rigidly mounted spindle nut the difficulty exists in principle that the spindle or the spindle nut cannot compensate any transverse forces occurring in operation, or only to a limited extent. This leads to tensions of the adjusting device in the region of the drive, which can have an adverse effect on acoustics and modulation. In the aforementioned document it is proposed for example in this connection to use a flexible spindle and rotatably mount a spindle end about a transverse axis.

A flexible spindle then can compensate deformations and tensions of the driving device. Due to their construction, flexible spindles however have a much lower strength as compared to rigid spindles. The forces to be transmitted via the flexible spindle thus are much lower than in a rigid spindle of comparable dimension. Furthermore, due to the manufacturing method a flexible spindle usually can only be provided with an external thread that must be provided with a rougher tolerance than the thread of a rigid spindle.

SUMMARY

It hence is the object underlying the proposed solution to provide an adjusting device of a lumbar support or a side-bolster adjuster for a vehicle seat, which comprises at least one spindle drive and in which tensions of the driving device occurring in operation can be avoided safely and effectively, without necessarily having to provide a flexible spindle.

This object is achieved with an adjusting device with features as described herein.

According to the solution, there is proposed an adjusting device in which a spindle drive of at least one driving device of the adjusting device comprises a spindle extending along a spindle axis, which on a fastening part of the lumbar support or of the side-bolster adjuster to be mounted in the vehicle seat is floatingly mounted at a spindle end via a spindle holder such that at this spindle end the spindle is displaceable on the fastening part of the lumbar support or the side-bolster adjuster with respect to two first and second spatial directions extending approximately perpendicularly to each other and each perpendicularly to the spindle axis.

Via the spindle holder, the spindle end thus is displaceable on the fastening part of the lumbar support or of the side-bolster adjuster with respect to two spatial directions extending radially with respect to the spindle axis, and the spindle end hence can carry out compensating movements transversely to the spindle axis in order to avoid occurring tensions. The spindle end held in the spindle holder thus usually has e.g. at least four degrees of freedom along two spatial axes perpendicular to each other. Via the spindle holder, however, at least a displaceability in axial direction is prevented. With a stationary spindle and a rotating spindle nut meshing with the spindle a rotation of the spindle about the spindle axis also is blocked via the spindle holder.

The displaceable spindle end can be held on the fastening part via the spindle holder so as to be shiftable along the first spatial direction and/or be rotatable about the first spatial axis, and so as to be shiftable along the second spatial direction and/or be rotatable about the second spatial axis.

Thus, this includes in particular a design variant in which via the spindle holder the displaceable spindle end is shiftable on the fastening part along the first spatial direction and is rotatable about the second spatial axis. Alternatively or in addition, the displaceable spindle end can be held via the spindle holder so as to be (also) shiftable on the fastening part along the second spatial direction and be rotatable about the first spatial direction.

In one variant, the spindle holder comprises a first and a second compensating element for a displaceability of the spindle end with respect to the two first and second spatial directions extending approximately perpendicularly to each other and each perpendicularly to the spindle axis, which are displaceable relative to each other so that the first compensating element together with the spindle end is displaceably held on the second compensating element.

The spindle end additionally may be displaceably held on the first compensating element, and the first compensating element together with the spindle end is displaceably held on the second compensating element. The spindle end can be displaceably held on the first compensating element along the first spatial direction and the first compensating element together with the spindle end can be displaceably held on the second compensating element along the second spatial direction.

Alternatively, the spindle end can be rigidly connected to the first compensating element so that a displaceability of the spindle end ultimately only is provided via the displaceability of the first compensating element relative to the second compensating element.

A linear movement along the first spatial axis and a rotational movement about the other, second spatial axis may be permitted via the first and second compensating elements in order to avoid tensions. Alternatively or in addition, a linear movement along the second spatial axis and a rotational movement about the first spatial axis can be permitted via the spindle holder.

In one design variant, the displaceable spindle end is positively held on the first compensating element and shiftable along the first spatial direction and/or rotatable about the first spatial direction, and the first compensating element is positively held on the second compensating element and shiftable along the second spatial direction and/or rotatable about the second spatial direction. The displaceability of the spindle end along the first and second spatial directions thus is achieved here by the cooperation of the first and second compensating elements shiftable relative to each other and/or rotatable and by the shiftable and/or rotatable support of the spindle end on the first compensating element.

The first compensating element can form a channel-like receptacle in which an end piece of the spindle is positively and shiftably held in the manner of a sliding block. For a simple connection between the compensating element and the end piece of the spindle, the channel-like receptacle can be formed open on one side so that the end piece can be pushed into the compensating element via the open side or the first compensating element can be pushed onto the end piece at the spindle end. The connection between the spindle end and the first compensating element here is effected before connecting the first and second compensating elements of the spindle holder to each other. The compensating elements hence are configured here such that for the assembly of the spindle holder the end piece of the spindle end can be pushed into the first compensating element, before the first compensating element is mounted to the second compensating element. Mounting the first compensating element to the second compensating element may be effected in that the first compensating element likewise is inserted into a channel-like receptacle of the second compensating element and then is shiftably held therein.

In principle, it can be provided that the second compensating element limits a displacement of the spindle end relative to the first compensating element. Hence, when the spindle holder is properly mounted, a displaceability of the spindle end relative to the first compensating element is permitted in one variant via the first compensating element. The displaceability of the spindle end however is limited here via the second compensating element so that the spindle end cannot arbitrarily be displaced relative to the first compensating element. Via the second compensating element it thus is prevented that in operation of the adjusting device the spindle end can be removed from the first compensating element.

It may be provided in this connection that on the properly mounted adjusting device the second compensating element closes the possibly unilaterally open, channel-like receptacle of the first compensating element to such an extent that the end piece of the spindle end cannot be displaced out of the receptacle of the first compensating element. A possible separation of the spindle end from the first compensating element or vice versa of the first compensating element from the spindle end rather is possible only by a disassembly of the spindle holder.

In a design variant, the second compensating element—alternatively or in addition to a (first) channel-like receptacle of the first compensating element—forms a possibly unilaterally open, (second) channel-like receptacle in which the first compensating element is positively and shiftably held in the manner of a sliding block. To consequently also hold the spindle end on the spindle holder so as to be displaceable relative to a second spatial direction, the second compensating element in this variant forms a sliding fit for the first compensating element. Hence, when the spindle end in operation experiences a transverse force with a directional component along which a displacement of the first compensating element is permitted via the second compensating element, the first compensating element together with the end piece of the spindle end held therein can carry out a compensating movement and hence avoid a tension or undesired deformation of the spindle, which may be rigid, as a result of a transverse force acting on the spindle.

In a design variant, the receptacle of the first compensating element is open towards a first side, which by about 90° about the spindle axis is offset from a second side towards which the receptacle of the second compensating element is open. In this way, an insertion of the first compensating element into the (second) receptacle of the second compensating element can be effected along a (second) transverse direction that extends perpendicularly to a (first) transverse direction along which an end piece of the spindle end has been pushed into the (first) receptacle of the first compensating element. Due to this mutual offset on the one hand a comparatively easy and tool-less assembly of the spindle holder including the fixation of the spindle end on the spindle holder is possible. Furthermore, it thereby can also easily be ensured that in operation of the adjusting device the spindle end is not easily and hence inadvertently released out of the spindle holder and from both compensating elements.

The fastening component on which the spindle holder is provided for the displaceable spindle end can be provided on a guiding device of the adjusting device, via which the adjusting device is mounted on the vehicle seat as a premounted assembly. The guiding device here may be part of an adjusting module formed by the adjusting device. The displaceable spindle end thus is already fixed to the spindle holder of the fastening part before the premounted adjusting device with its driving device, the fastening part and the spindle drive including the spindle is mounted to the vehicle seat.

The guiding device may be formed by a wire frame or a wire bracket, which is to be fixed on a backrest or a seat underpart of the vehicle seat in order to properly position the adjusting device within the vehicle seat and behind a seat cushion.

In an alternative design variant the fastening component is a seat-fixed component of the vehicle seat to which at least a part of the adjusting device (with the spindle drive) is mounted as a premounted assembly. Thus, a connection of the spindle end with the fastening part (and hence possibly of a first compensating element with a second compensating element of the spindle holder) here is effected only when the adjusting device is mounted to the vehicle seat. Thus, the fastening part here forms a seat-fixed interface on the vehicle seat, at which a connection with the spindle drive of the adjusting device to be mounted subsequently is effected. The fastening part can be part of a backrest frame, a seat base or another frame-fixed (supporting) carrier component of the vehicle seat, or the fastening part is fixed to such a part before the adjusting device is mounted to the vehicle seat. The connection with the seat-fixed fastening part hence can be effected only when an adjusting module including a guiding device, the at least one adjustably mounted support element and the at least one driving device is mounted to the vehicle seat or to the corresponding subassembly of the vehicle seat with the seat-fixed fastening part.

In one design variant, the adjusting device includes a guiding device on which a carrier of the adjusting device is shiftably mounted, which carries the at least one driving device. The carrier can be a plate-shaped component on which essential parts of the driving device, such as a drive motor and/or a transmission are mounted. The guiding device can comprise a rail or a wire bracket on which the carrier is shiftably held for positioning the adjusting device.

The carrier can be shiftable by means of the spindle drive of the driving device, whose spindle includes the displaceable spindle end. In principle, the adjusting device can include a plurality of different driving devices, for positioning the adjusting device on the one hand and for adjusting the at least one support element (relative to the carrier) on the other hand. In the above-mentioned design variant the spindle drive with the displaceable spindle end then is provided especially for the adjustment of the carrier and hence for example for positioning the adjusting device on the vehicle seat, while an extension and retraction of the at least one support element for variably changing the contours or the position of the seat element is driven via another driving device of the adjusting device.

The adjusting device can include an adjusting part shiftably mounted relative to the carrier—may be on the same guiding device—, by means of which the at least one support element is adjustable. The adjusting part may be a shiftably mounted slider, wherein the carrier and this slider are shiftable relative to each other via a spindle drive in order to control an adjustment of the at least one support element.

To change the contour and/or position of the seat element, the at least one support element may be adjustable along an adjustment direction that includes a directional component extending perpendicularly to the adjustment axis of the adjusting part. By pushing together carrier and adjusting part, the support element can be extended (further), in particular be pivoted, via a corresponding lever mechanism. The adjusting part and the carrier may be shiftable relative to each other along a first spatial direction and the adjusting part may be coupled with a pivotally mounted force transmission member, may be in the form of a toggle lever, wherein the pivot axis of this toggle lever then is aligned in a second spatial direction extending perpendicularly to the first spatial direction.

The at least one support element of the adjusting device then is adjustable, may be pivotable, in a plane that is defined by the first spatial direction and a third spatial direction extending perpendicularly to the first and second spatial directions. A kinematic of the adjusting device, which may be part of a lumbar support or a side-bolster adjuster for a seat underpart or a backrest, hence translates a drive-side linear movement, which may be in the +/− z-direction of a vehicle seat system of coordinates, into a movement along a curved or circular path offset from this z-direction by an angle, which may be in the +/− x-direction of the vehicle seat system of coordinates. When introducing the linear movement via the stroke of changing lever lengths or angles of a toggle lever into a support element a gear ratio changing with the stroke is achieved, whereby a fast feed at the beginning of the movement in the lower part of the stroke (in x-direction) and a large force in the upper part of the stroke can be achieved in connection with a slower adjustment speed for fine adjustment. Among other things, the use of small low-power, but space-saving and inexpensive electric motors for a corresponding driving device of the adjusting device thereby is possible with an acceptable adjustment acoustic and in particular without an excessive motor noise.

In one design variant, the adjusting device includes a spindle drive in which a rotatable spindle meshes with a non-rotatable spindle nut. Via a bearing point the spindle nut can be mounted on an adjusting part that is adjustable by means of the spindle drive, wherein at the bearing point at least one elastic compensating element is provided. Via this elastic compensating element the spindle nut is held on the adjusting part such that the spindle nut along with a portion of the spindle meshing with the spindle nut is displaceable at least along a spatial direction extending perpendicularly to the spindle axis by elastically deforming the compensation element.

In this variant—possibly in addition to a spindle holder comprising first and second compensating elements—a compensating movement of the spindle nut and hence also of the spindle guided therethrough specifically is permitted via the at least one elastic compensating element so that the spindle nut can carry out a compensating movement by elastically deforming the compensating element, when radially acting transverse forces are applied to the spindle in operation of the adjusting device.

In one design variant, the adjusting device comprises two spindle drives with one spindle each. By means of a first spindle a carrier of the adjusting device together with an adjusting part adjustable relative thereto can be shiftable along a guiding device and by means of the second spindle the carrier and the adjusting part can be shiftable relative to each other. Via a first driving device with the first spindle the carrier and the adjusting part thus are jointly adjustable, while via a second driving device with the second spindle the carrier and the adjusting part are adjustable relative to each other.

One spindle in principle can cooperate with a spindle nut drivable to perform a rotation about the associated spindle axis, while the other spindle is drivable to perform a rotation about the spindle axis and meshes with a non-rotatable spindle nut. Hence, a stationary spindle and a rotatable spindle might be provided on one and the same adjusting device in order to realize different adjusting movements.

In one design variant, a spindle end of a first spindle—possibly via first and second compensating elements of the spindle holder—is displaceably held with respect to the two first and second spatial directions extending approximately perpendicularly to each other and each perpendicularly to the spindle axis of the first spindle and a spindle nut meshing with another, second spindle by elastically deforming a further, third compensating element at least along a spatial direction extending perpendicularly to the spindle axis of the second spindle. Thus, different measures are provided for the individual spindles in order to permit a compensating movement of the respective spindle transversely to the associated spindle axis and hence avoid tensions on the respective driving device. However, this of course is not absolutely necessary. This also applies for the exclusive use of a rigid or flexible spindle. In principle, an adjusting device according to the solution can also be realized with one or more flexible spindles.

In one design variant it is provided that at least one spindle nut and/or at least one spindle of the adjusting device with at least one portion is circumferentially mounted on a bearing point via a two-part bearing shell. The bearing shell, however, is not symmetrically or centrally divided via two bearing parts. Rather, the spindle or spindle nut already is supported and enclosed over more than half of the circumference via an individual bearing part of the bearing shell.

One of the bearing parts thus already decisively determines the positioning of the respective drive part, i.e. of the spindle or the spindle nut, while the second bearing part chiefly serves to close the bearing shell and possibly (finally) limit a radial displaceability of the spindle or spindle nut towards one side. Thereby, a shorter tolerance chain and hence an improved positioning accuracy of the movable drive parts relative to each other can be realized.

The adjusting device, as already indicated above, may be equipped and provided to variably change the shape of a support region or a side bolster of a seat underpart, of a backrest or of a headrest of a vehicle seat. The adjusting device in particular can be provided for the adjustment of the convexity and/or width of lateral support regions or side bolsters of a seat underpart or a backrest of the vehicle seat. In particular, the adjusting device can be part of a lumbar support of the vehicle seat for the lumbar vertebrae region of a vehicle occupant or a side-bolster adjuster of the vehicle seat.

BRIEF DESCRIPTION OF THE DRAWINGS

The attached Figures by way of embodiments illustrate possible design variants of the solution.

FIG. 2 shows an enlarged representation of a spindle end of a spindle belonging to a driving device of the adjusting device of FIG. 1 wherein the spindle end—other than shown in FIG. 1—is displaceably held in a seat-fixed spindle holder.

DETAILED DESCRIPTION

Figure 1:
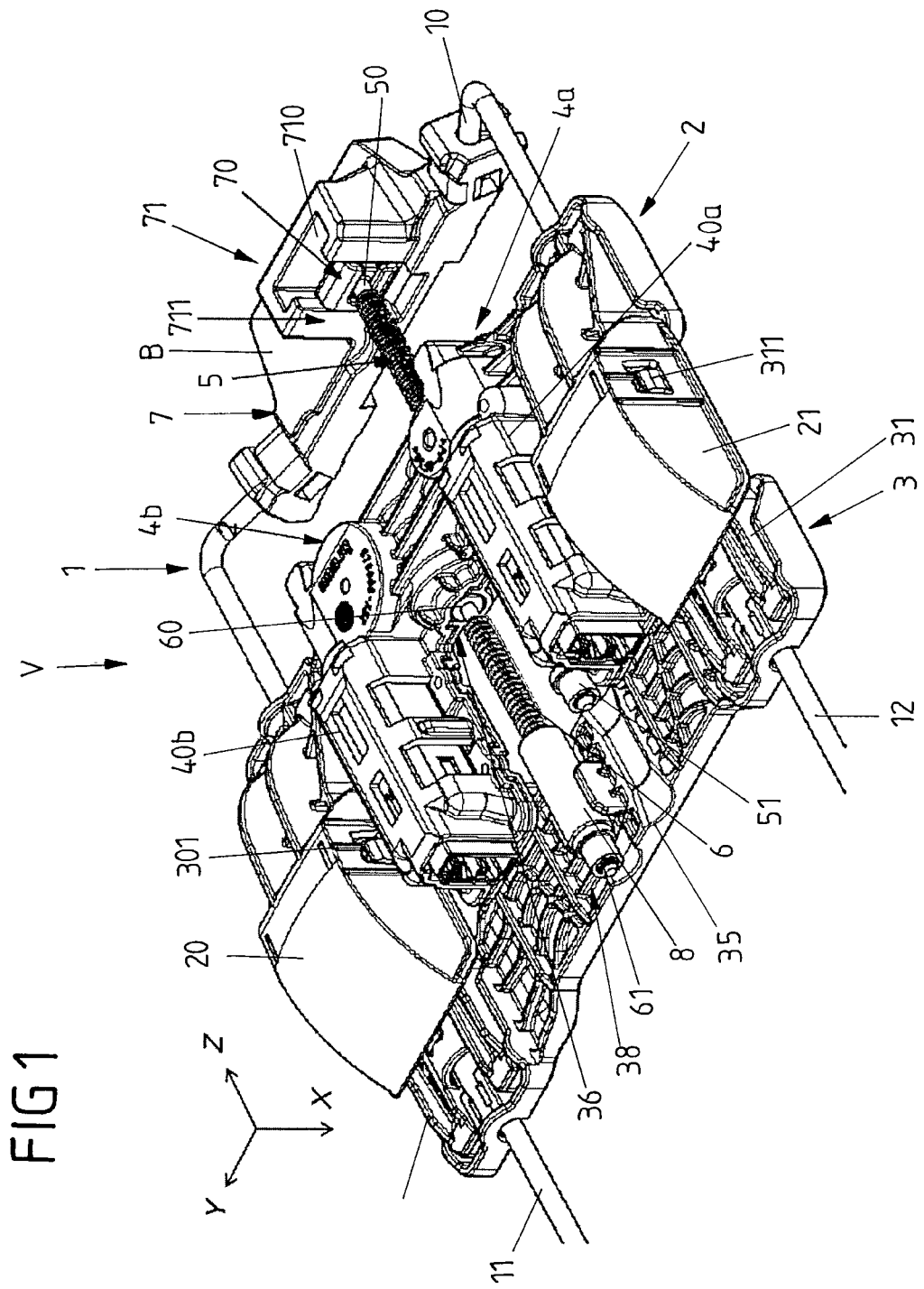
FIG. 1 shows a first embodiment of an adjusting device with a guiding device in the form of a wire bracket on which a carrier and an adjusting part in the form of a slider are shiftably mounted.

In a perspective representation with reference to the spatial directions of an xyz vehicle seat system of coordinates FIG. 1 shows a modular adjusting device V that may be usable for a side-bolster adjuster or a lumbar support, which can be mounted into the seating surface or backrest of a vehicle seat and is connected to the strength structure of the seating surface or backrest. The adjusting device V includes two support elements in the form of two support levers 20 and 21, which can act on a possibly upholstered seat element S, e.g. a comfort mat of the vehicle seat (cf. FIGS. 7A and 7B), in order to variably change the contour and/or position of the seat element S, in particular to change its convexity and/or width. Via the seat element S a body part of a seat user usually is supported when the same is properly seated on the vehicle seat.

For the connection of the adjusting device V with the strength structure of the vehicle seat, which may be a seat base or a backrest frame, the adjusting device V includes a guiding device in the form of a wire bracket 1. The wire bracket 1 can be part of an adjusting module formed with the device V. Alternatively, the wire bracket 1 can be part of the backrest frame or seat base, to which the further components of the adjusting device V are mounted.

The wire bracket 1 includes two guide legs 11 and 12 extending along a z-direction, which are connected to each other via a transverse strut 10 extending transversely thereto at an end of the wire bracket 1 located in the z-direction. Along the guide legs 11 and 12 a carrier 2 and an adjusting part in the form of a slider 3 of the adjusting device V are linearly shiftably mounted. The plate-shaped carrier 2 in particular carries two driving devices 4a and 4b of the adjusting device V, via which on the one hand a power-operated adjustment of the carrier 2 together with the slider 3 is possible and on the other hand a power-operated adjustment of the carrier 2 and the slider 3 relative to each other. Both the carrier 2 and the slider 3 shiftably rest against the guide legs 11 and 12 of the wire bracket 1 via sliding blocks or sliding shoes so that via the respective driving device 4a or 4b a displacement of the respective component of the adjusting device V, i.e. of the carrier 2 or slider 3, along the guide legs 11 and 12 is possible.

A first driving device 4a includes a spindle drive with a first spindle 5 for the joint adjustment of the carrier 2 and the slider 3. Onto an external thread of the spindle 5 a spindle nut is turned, which can be put into rotation by a drive unit 40a of the first driving device 4a. For the motorized adjustment the drive unit 40a may be configured as a motor-transmission unit with an electric motor and a transmission for stepping down or stepping up the motor speed as required.

When the spindle nut meshing with the first spindle 5 is put into rotation by the drive unit 40a mounted on the carrier 2, the spindle nut is shifted along a spindle axis SA of the first spindle 5 (cf. also FIG. 2) in the −z direction or +z direction depending on the direction of rotation and thereby entrains the carrier 2. Via the first driving device 4a, the position of the carrier 2 together with the slider 3 in this way can be motor-adjusted along the wire bracket 1. Thus, the carrier 2 and the likewise plate-shaped slider 3 are rigidly coupled with each other via a second spindle 6 of a second driving device 4b. Hence, when the carrier 2 is shifted along the guide legs 11 and 12 via a rotation of the spindle nut by means of the drive unit 40a of the first driving device 4a, the slider 3 also is shifted along the guide legs 11 and 12. In this way, a position of carrier 2 and slider 3 can be variably adapted via the drive unit 40a in or against the z-direction, may be in order to change a position of a lumbar support formed thereby and adjust the same in its height on a backrest.

For acting on the seat element S of the vehicle seat not shown in FIG. 1 via the support elements of the adjusting device V formed here as support levers 20 and 21, the carrier 2 and the slider 3 are shiftable relative to each other via the second driving device 40b and its second spindle 6, in particular shiftable towards each other or away from each other. Via the adjustment of the carrier 2 and the slider 3 relative to each other the laterally arranged support levers 20 and 21, between which the drive units 40a and 40b of the two driving devices 4*a* and 4*b* are accommodated, are synchronously lifted or lowered.

For the adjustment of the carrier 2 and the slider 3 relative to each other, the second spindle 6 rotatable here meshes with a spindle nut 8, which in axial direction, i.e. along a spindle axis SB of the second spindle 6, is firmly connected to the slider 3 at a bearing point 38. When the second spindle 6 is put into rotation via the drive unit 40*b* of the second driving device 4*b*, the second spindle 6 hence is screwed out of the spindle nut 8 meshing with the external thread of the second spindle 6 or screwed into the spindle nut 8. The slider 3 forcibly guided along the guide legs 11 and 12, to which the spindle nut 8 is fixed, thereby is translatorily shifted in the −z direction or +z direction and the distance between the carrier 2 and the slider 3 thereby is linearly changed. Via the changing distance between the carrier 2 and the slider 3 the support levers 20 and 21 are lifted or lowered, which in their maximally lowered position illustrated in FIG. 1 extend in the −z direction towards the slider 3.

The support levers 20 and 21 therefor are each pivotally attached to the carrier 2. A pivot axis of a support lever 20 or 21 each extends perpendicularly to the z-direction parallel to a y-direction of the vehicle seat system of coordinates. Each support lever 20 or 21 furthermore is connected to an associated force transmission member in the form of a toggle lever 30 or 31 of the slider 3 via a connecting joint 301 or 311. Each toggle lever 30 or 31 is articulated to the slider 3 about a pivot axis extending along the y-direction and extends in the z-direction towards the carrier 2. At a maximum spacing of the carrier 2 and the slider 3 the support levers 20 and 21 are maximally lowered. When the carrier 2 and the slider 3 approach each other, the toggle levers 30 and 31 pivotally mounted on the slider 3 are pivoted and the ends of the toggle levers 30 and 31 opposite to the pivot axes are lifted. The support levers 20 and 21 connected to the ends of the toggle levers 30 and 31 via the connecting joints 301 and 311 thereby are pivoted about their pivot axes on the carrier 2 and lifted.

Figure 7A:
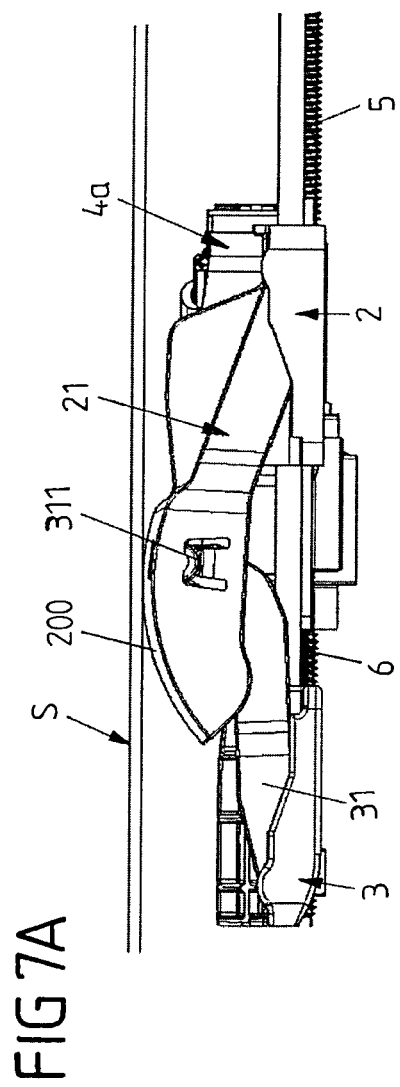
FIGS. 7A-7B in a side view show different positions of one of two support elements of the adjusting device of FIG. 1, which acts on a seat element below a seat cushion, e.g. on a comfort mat (without showing the seat cushion).
Figure 7B:
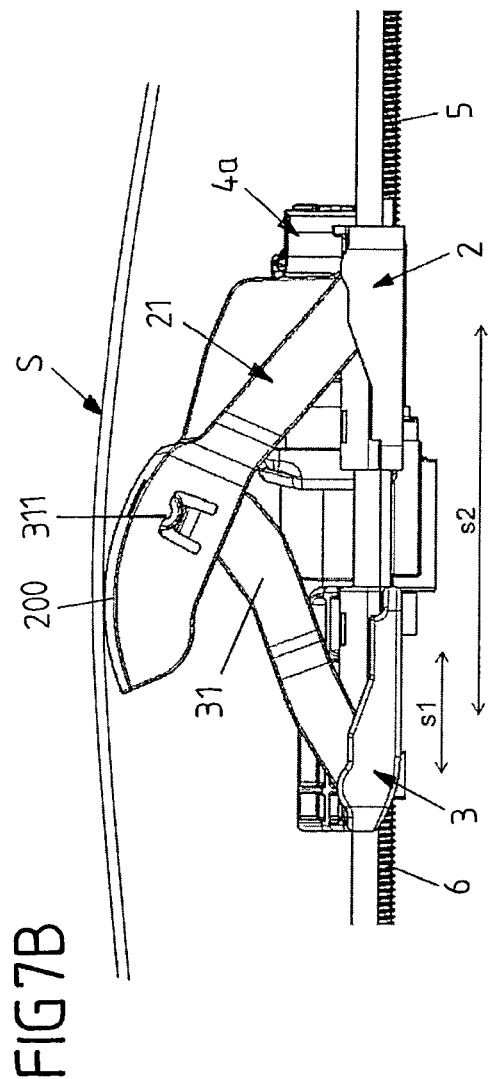

With reference to the side views of FIGS. 7A and 7B the cooperation of the toggle levers 30, 31 with the support levers 20 and 21 is illustrated with a view to the pair of toggle lever 31 and support lever 21 shown on the right in FIG. 1.

The support lever 21 acts on the seat element S via a convexly curved contact surface 200, which seat element may be formed by a flexible comfort mat of the backrest in order to change its contour and/or position by lifting the support lever 21. The adjustment of a support lever 20 or 21 apparently is effected in an xz-plane, wherein a maximum possible adjustment path is limited by the permitted adjustment s1 of the carrier 2 and the slider 3 relative to each other.

Independent of the relative position of the carrier 2 and the slider 3 the position of the contact surface 200 can be varied along an adjustment path s2 by means of the first driving device 4*a* by jointly shifting the carrier 2 and the slider 3 along the guide legs 1 and 12.

To avoid the occurrence of tensions, may be by transverse forces acting on the first or second spindle 5, 6, in operation of the adjusting device V, the first spindle 5 in the illustrated design variant is floatingly mounted at a spindle end 50 spaced apart from the carrier 2 via a spindle holder 7. The spindle holder 7 here is provided on the transverse strut 10 of the wire bracket 1. A fastening part B fixed to the transverse strut 10 here forms a sleeve-shaped protrusion 711 protruding in the −x direction. This protrusion 711 defines a (second) channel-like receptacle 710 unilaterally open in the −x direction of a (second) compensating element 71 of the spindle holder 7.

In the receptacle 710 of this compensating element 71 a further (first) compensating element 70 is shiftably and positively held along the x-direction in the manner of a sliding block. This (first) compensating element 70 furthermore shiftably supports an end piece 500 of the spindle end 50 of the first spindle 5 along the y-direction in the manner of a sliding block. This end piece 500 here is shiftably and positively held in a (first) channel-like receptacle 700 of the first compensating element 700, which is unilaterally open towards the −y direction. The support of the end piece 500 on the first compensating element 70 here is such that an axial displacement of the first spindle 5 along its spindle axis SA as well as a rotation of the first spindle 5 about its spindle axis SA thereby is blocked by the first compensating element 70. At the same time, however, a relative displacement of the spindle end 50 along the y-direction is permitted via the first compensating element 70. In addition, the spindle end 50—together with the first compensating element 70 positively connected thereto—can be displaced on the second compensating element 71 along the x-direction extending perpendicularly to the y-direction. In the present case, the compensating elements 70 and 71 also permit a rotational movement of the first spindle 5 beside the linear movement. Via the end piece 500 and the receptacle 700 of the first compensating element 70 a rotational movement about the x-axis and about the ±x direction also may become possible beside a linear movement along the y-direction. A correspondingly larger dimensioning of the receptacle 700 in relation to the end piece 500 therefor is chosen so that the end piece 500 can also be displaced about the x-axis within the (first) receptacle 700. Via the first and second compensating elements 70 and 71 a rotational movement about the Y-axis or about the ±y direction furthermore becomes possible beside a linear movement in the x-direction. Correspondingly, the first compensating element 70 also can be displaced about the Y-axis within the (second) receptacle 710.

Via the spindle holder 7, the spindle end 50 of the first spindle 5 hence is floatingly displaceable with respect to two spatial directions x and y extending perpendicularly to each other and each perpendicularly to the spindle axis SA of the first spindle 5 in order to avoid tensions in the region of the first spindle 5 and permit a compensating movement of the first spindle 5. With respect to both spatial directions x and y both a translatory and a rotatory displacement is specifically permitted in order to avoid tensions. In operation of the adjusting device V the rotatory degree of freedom about the Y-axis in conjunction with the linear degree of freedom in the ±x-direction usually plays the greater role in order to avoid tensions of the transmission parts with an occurring deflection of the guides provided via the guide legs 11 and 12.

For an easier mountability of the spindle holder 7 the two compensating elements 70 and 71 are open towards two sides, which are offset from each other about the spindle axis SA by 90°. The first compensating element 70 thus can be pushed onto the end piece 500 of the spindle end 50, before subsequently the first compensating element 70 is pushed into the second compensating element 71, whereby the side on which the receptacle 700 of the first compensating element 70 is open is closed by the walls bordering the receptacle 70 of the second compensating element 71, Then, it is also prevented thereby that the spindle end 50 with its end piece 500 can inadvertently be separated from the same without disassembly of the spindle holder 7.

In an alternative variant the first compensating element 70 is positively and non-rotatably connected to the end piece 500 so that after the assembly the end piece 500 and the compensating element 70 no longer are displaceable relative to each other. In this variant a compensating movement of the spindle end 50 only is permitted via the support of the first compensating element 70 on the second compensating element 71. The spindle end 50 then is shiftable along the x-direction and hence translatorily displaceable with respect to the x-direction as well as rotatable about the y-direction and hence rotatorily displaceable with respect to the y-direction. Instead of two separately manufactured components to be connected with each other in the form of the end piece 500 and the first compensating element 70 a one-piece construction can also be provided. At the spindle end 50 an end piece having the dimensions of the first compensating element 70 of FIGS. 1 and 2 may be integrally molded and this end piece is directly inserted into the receptacle 710 of the compensating element 71 in order to hold the spindle end 50 so as to be linear with respect to the x-direction and rotatorily displaceable with respect to the y-direction. The end piece then is shiftable within the receptacle 710 in the x-direction and at least slightly rotatable about the y-direction.

A second spindle end 51 of the first spindle 5 moreover is adjacent to the second spindle 6 extending parallel to the first spindle 5 and when necessary, i.e. when the carrier 2 and the slider 3 correspondingly are adjusted relative to each other along the guide legs 11 and 12, can be received and supported in a channel-like depression 35 of the slider 3.

While in the variant shown in FIG. 1 the spindle holder 7 is provided on the guiding device in the form of the wire bracket 1, via which the assembly of the premounted adjusting device V on the vehicle seat is effected, FIG. 2 on an enlarged scale illustrates a variant in which a spindle holder 7' is provided with the second compensating element 71 on a seat-fixed fastening part B. The second compensating element 71 may be fixed to a part of the backrest frame of the backrest or formed thereon. A premounted adjusting device V hence can then already include the first compensating element 70 at the floatingly mountable spindle end 50 of the first spindle 5, in which the end piece 500 of the spindle end 50 is positively and shiftably held. When mounting the adjusting device V to the vehicle seat, however, the first compensating element 70 first is mounted to the seat-fixed fastening part B integrating the second compensating element 71 of the spindle holder 7'.

In this variant the second compensating element 71 thus is fixed to a seat-fixed fastening component B or integrally mounted thereto, may be fixed to a backrest frame or integrally mounted to a backrest frame, and the spindle end 50 of the first spindle finally is floatingly supported only when mounting the adjusting device V to the corresponding assembly of the vehicle seat. Depending on the interface and type of the adjusting device V, the design of the second compensating element can also be varied so that then an appropriate first compensating element out of several possible first compensating elements 70 can then be put onto the initially free spindle end 50 of the first spindle 5.

Figure 3A:
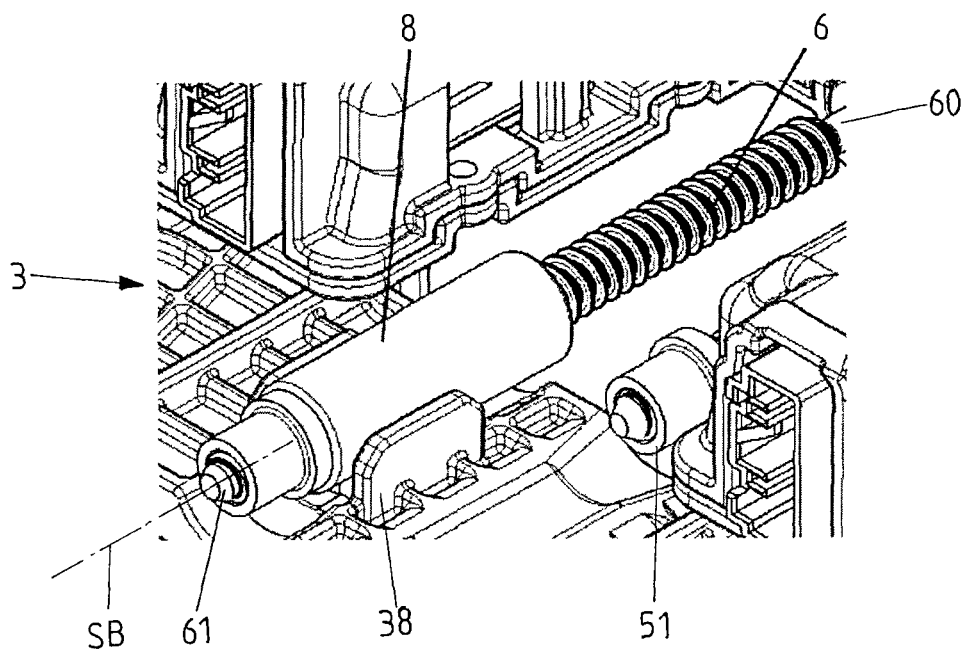
FIG. 3A sectionally shows the adjusting device of FIG. 1 with a view to a second spindle of a second driving device for the adjustment of the carrier and the slider relative to each other with a view to a slider-fixed spindle nut.
Figure 3B:
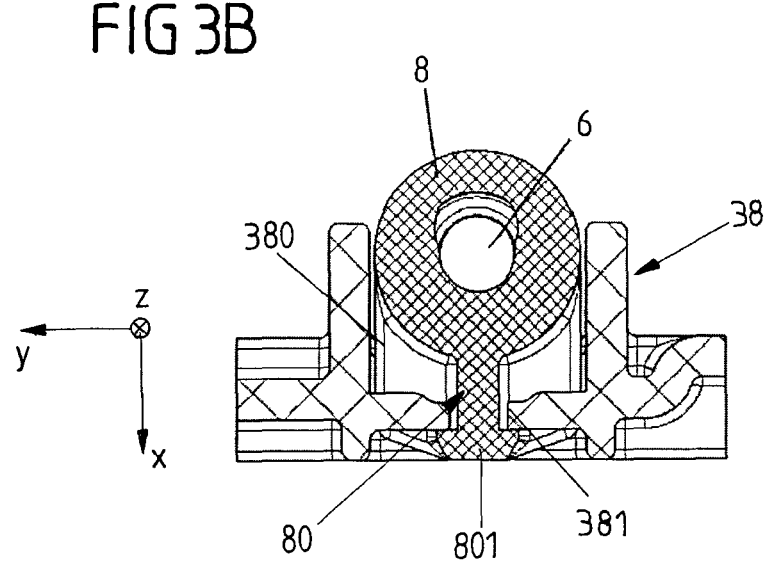
FIG. 3B shows a sectional representation through the spindle nut of FIG. 3A.

With reference to FIGS. 3A and 3B a likewise floating support of the rotatable second spindle 6 via the slider-fixed spindle nut 8 furthermore is also illustrated in detail. The spindle nut 8 meshing with the second spindle 6 here is axially fixed with respect to the spindle axis SB of the second spindle 6 in a bearing receptacle 380 of the bearing point 38 via a securing portion extending radially in the x-direction, but is radially displaceable to a limited extent, in particular along the x-direction, to carry out a compensating movement. The radially protruding securing portion 80 configured as a web or pin with a broadened head 801 therefor engages around an edge of a holding opening 381 provided in the bearing receptacle 380 of the slider 3. In this way, the second spindle 6 is radially fixed to a first spindle end 60 coupled with the second driving device 4b. In the region of the other, second spindle end 61 close to the slider-fixed spindle nut 8, however, a floating support is realized at the bearing point 38 via the spindle nut 8.

Figure 4A:
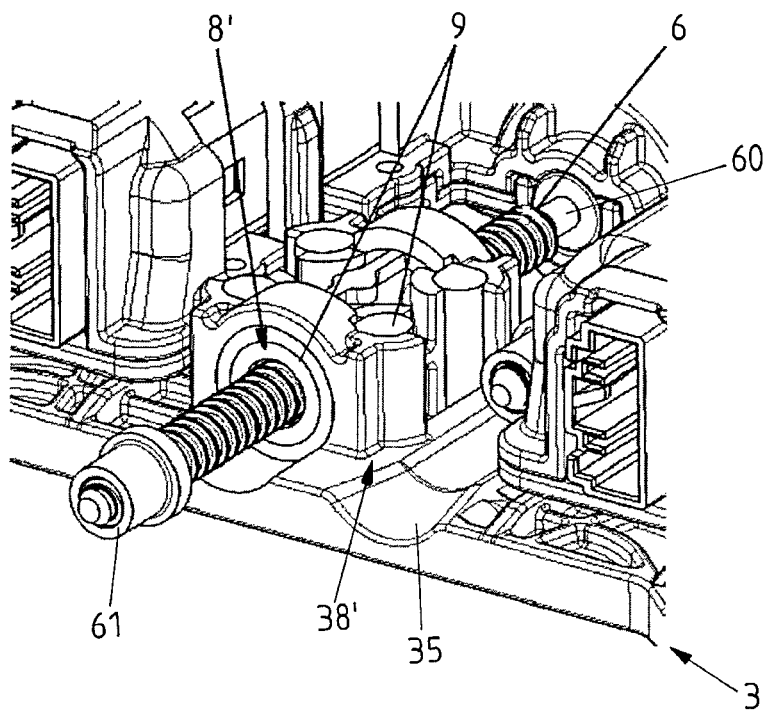
FIGS. 4A-4B in different views sectionally show an alternatively designed and differently mounted spindle nut for the second spindle.
Figure 4B:
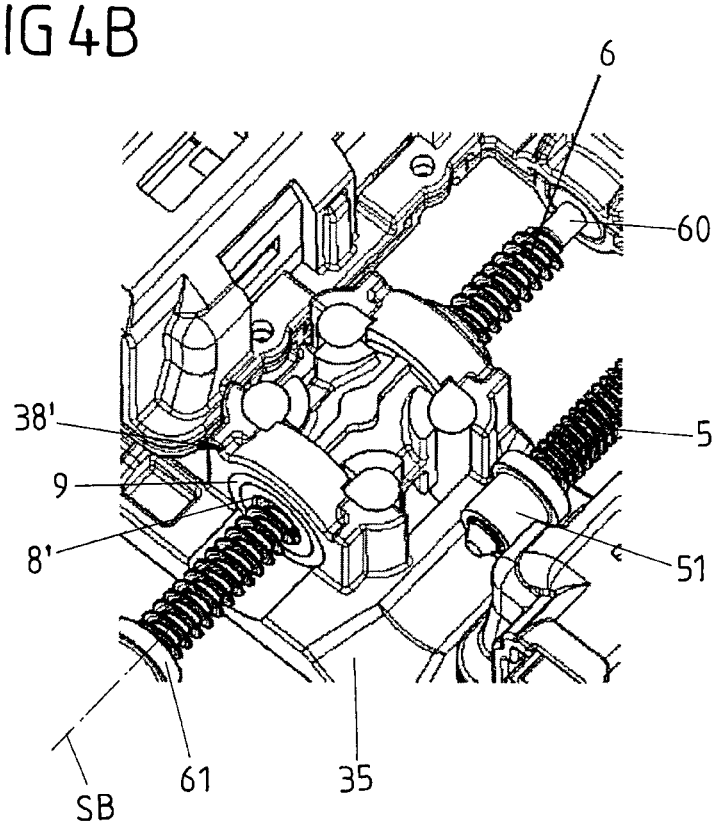

With reference to FIGS. 4A and 4B an alternative floating support in the region of the second spindle end 61 via a slider-fixed spindle nut 8' is illustrated in detail. The spindle nut 8' here is axially fixed at an alternatively designed bearing point 38' and is radially displaceably held to provide for a radial compensating movement. The spindle nut 8' therefor is circumferentially fixed at the bearing point 38' via a sleeve-shaped or ring-shaped elastic (third) compensating element 9. Via the elastic compensating element 9 which may be manufactured from a rubber or an elastic plastic material the spindle nut 8' is held on the slider 3 such that the spindle nut 8' is displaceable along both spatial directions x and y extending perpendicularly to the spindle axis SB with a portion of the second spindle 6 meshing with the spindle nut 8' by elastically deforming the compensating element 9.

Thus, in the variant of FIGS. 4A and 4B the second spindle 6 rotatable for an adjustment of the carrier 2 and the slider 3 relative to each other also is floatingly mounted via the non-rotatable spindle nut 8' meshing with the second spindle 6 so that a compensating movement transversely to the spindle axis SB of the second spindle 6 is permitted. However, in contrast to the variant of FIGS. 3A and 3B, a radial displaceability specifically is permitted here via an elastic compensating element 9 damping the compensating movement at the same time, which circumferentially completely surrounds the spindle nut 8'.

Figure 5:
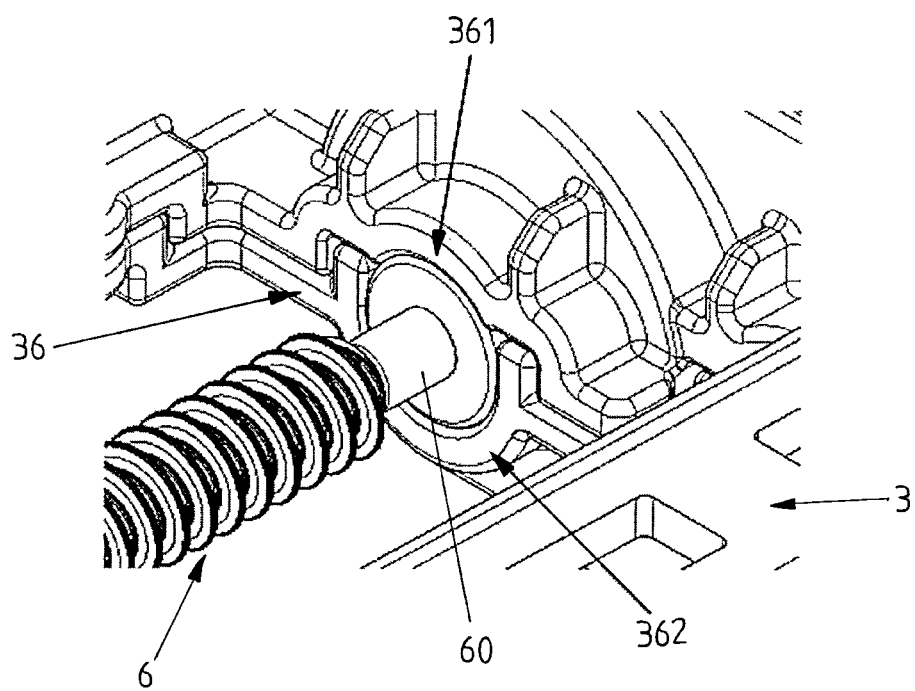
FIG. 5 on an enlarged scale and sectionally shows the support of a spindle end of the second spindle corresponding to FIG. 1.
Figure 6B:
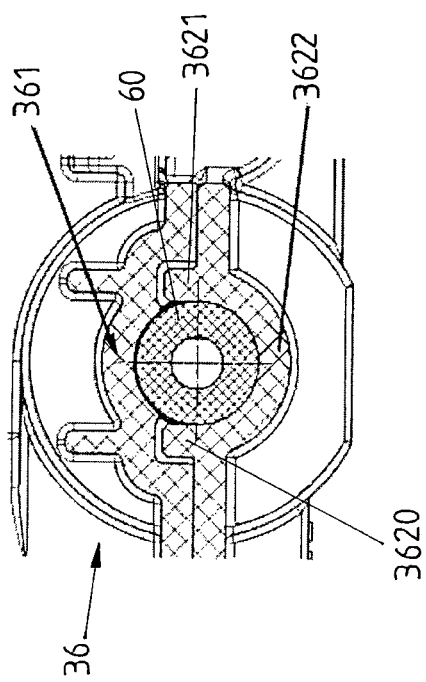
FIGS. 6A-6B show different sectional views to illustrate the support of the second spindle in the region of the spindle end of FIG. 5.
Figure 6A:
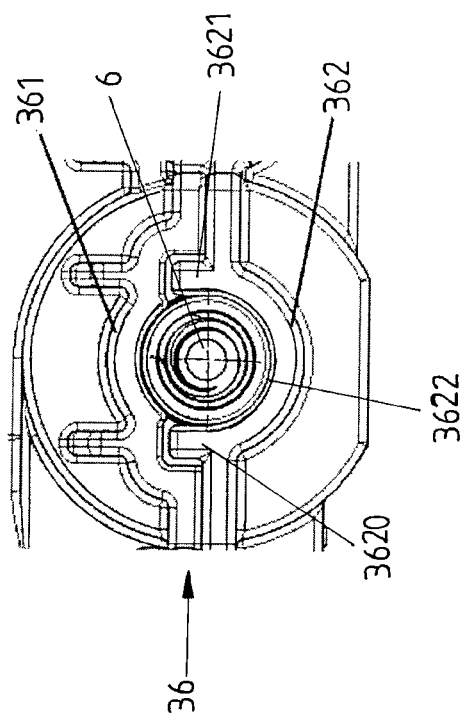

As is illustrated in more detail with reference to FIGS. 5 and 6A, 6B, the second spindle 6 of the adjusting device V corresponding to FIG. 1 is supported in a two-part bearing shell 3622 of a bearing point 36 of the slider 3 at its first spindle end 60 coupled with the drive unit 40b of the second driving device 4b. The bearing shell 3622 here is formed by two bearing parts 361 and 362 connected to each other, which are fixed to each other and form a lower part and an upper part of the bearing shell 3622. Via the bearing parts 360 and 361 the spindle end 60 is circumferentially supported and positively held at the bearing point 36.

A large part of the bearing shell 3622 is formed by the one bearing part 362. This bearing part 362 with lateral edge webs 3620 and 3621 laterally protrudes beyond a central axis of the second spindle 6 to such an extent that at the bearing point 36 the second spindle 6 is supported on the one bearing part 362 and enclosed over more than half of its circumference. A bearing housing with the bearing shell 3622 formed by the two bearing parts 361 and 362 thus is divided eccentrically with respect to the central axis of the second spindle 6. The one bearing part 362, which extends over more than half of the circumference of the second spindle 6 in the region of the bearing point 36, thus already decisively determines the position of the second spindle 6 at its first spindle end 60. The other bearing part 361 chiefly serves for closing the bearing shell 3622 and possibly finally limiting the radial displaceability of the spindle end 60 towards one side in the −x direction.

Although the divided bearing shell 3622 with an eccentrical division is illustrated with reference to the support of the spindle end 60 in FIGS. 5 and 6A to 6C, a corresponding bearing point 36 can of course also be provided for a—may be rotatably mounted—spindle nut of the adjusting device V, for example for the spindle nut meshing with the first spindle 5 of the first driving device 4a, via which in conjunction with the stationary first spindle 5 (for example for a height adjustment of a lumbar support formed with the adjusting device V) a joint displacement of the carrier 2 and the slider 3 along the guide legs 11 and 12 is possible.

LIST OF REFERENCE NUMERALS 1 wire bracket (guiding device)
10 transverse strut
11, 12 guide leg
2 carrier
20, 21 support lever (support element)
200 contact surface
3 slider (adjusting part)
30, 31 toggle lever
301, 311 connecting joint
35 depression
36 bearing point
361, 362 bearing part
3620, 3621 edge web
3622 bearing shell
38, 38' bearing point
380 bearing receptacle
381 holding opening
40a, 40b drive unit
4a, 4b driving device
5 1st spindle
50, 51 spindle end
500 end piece
6 2nd spindle
60, 61 spindle end
7, 7' spindle holder
70 1st compensating element
700 channel (first receptacle)
71 2nd compensating element
710 second receptacle
711 protrusion
8, 8' spindle nut
80 securing portion
801 head
9 compensating element
B fastening part
S seat element
SA, SB spindle axis
V adjusting device

The invention claimed is:

1. An adjusting device of a lumbar support or a side-bolster adjuster for changing the contour or position of a seat element of a vehicle seat supporting a body part of a seat user, the adjusting device comprising:
at least one driving device comprising a spindle drive and at least one adjustable support element for changing the contour or position of the seat element, wherein the spindle drive comprises a spindle extending along a spindle axis, which on a fastening part of the lumbar support or the side-bolster adjuster mounted in the vehicle seat is floatingly mounted at a spindle end via a spindle holder such that at the spindle end the spindle is displaceable along at least one spatial direction extending transversely to the spindle axis, wherein via the spindle holder the spindle end is displaceably held on the fastening part of the lumbar support or the side-bolster adjuster with respect to two first and second spatial directions extending approximately perpendicularly to each other and each perpendicular to the spindle axis,
wherein the spindle holder comprises a first and a second compensating element for a displaceability of the spindle end with respect to the two first and second spatial directions extending approximately perpendicularly to each other and each perpendicularly to the spindle axis, wherein the first compensating element is displaceably held on the second compensating element together with the spindle end.

2. The adjusting device according to claim 1, wherein via the spindle holder the displaceable spindle end is held on the fastening part
so as to be at least one of shiftable along the first spatial direction and rotatable about the first spatial direction, and
so as to be at least one of shiftable along the second spatial direction and rotatable about the second spatial axis.

3. The adjusting device according to claim 1, wherein via the spindle holder the displaceable spindle end is held on the fastening part so as to be at least one of
shiftable along the first spatial direction and rotatable about the second spatial direction
and
shiftable along the second spatial direction and rotatable about the first spatial direction.

4. The adjusting device according to claim 1, wherein the spindle end is displaceably held on the first compensating element or is rigidly connected to the first compensating element.

5. The adjusting device according to claim 1, wherein
the displaceable spindle end is positively held on the first compensating element and at least one of shiftable along the first spatial direction and rotatable about the first spatial direction, and
the first compensating element is positively held on the second compensating element and at least one of shiftable along the second spatial direction and rotatable about the second spatial direction.

6. The adjusting device according to claim 1, wherein the first compensating element forms a channel in which an end piece of the spindle is positively and shiftably held in the manner of a sliding block.

7. The adjusting device according to claim 6, wherein the second compensating element forms a channel in which the first compensating element is positively and shiftably held in the manner of a sliding block, wherein the receptacle of the first compensating element is open towards a first side, which by about 90° about the spindle axis is offset from a second side towards which the receptacle of the second compensating element is open.

8. The adjusting device according to claim 1, wherein the second compensating element forms a channel in which the first compensating element is positively and shiftably held in the manner of a sliding block.

9. The adjusting device according to claim 1, wherein the fastening part is provided on a guiding device of the adjusting device, via which the adjusting device is mounted on the vehicle seat as a premounted assembly.

10. The adjusting device according to claim 1, wherein the fastening component is a seat-fixed component of the vehicle seat, to which at least a part of the adjusting device is mounted as a premounted assembly.

11. The adjusting device according to claim 1, wherein the adjusting device comprises a guiding device on which a carrier of the adjusting device is shiftably mounted, which carries the at least one driving device.

12. The adjusting device according to claim 11, wherein the carrier is shiftable by means of the spindle drive of the driving device.

13. The adjusting device according to claim 11, wherein the adjusting device includes an adjusting part shiftably mounted relative to the carrier, by means of which the at least one support element is adjustable.

14. An adjusting device of a lumbar support or a side-bolster adjuster for changing the contour or position of a seat element of a vehicle seat supporting a body part of a seat user, the adjusting device comprising:
at least one driving device comprising a spindle drive and at least one adjustable support element for changing the contour or position of the seat element, wherein the spindle drive comprises a spindle extending along a spindle axis, which on a fastening part of the lumbar support or the side-bolster adjuster mounted in the vehicle seat is floatingly mounted at a spindle end via a spindle holder such that at the spindle end the spindle is displaceable along at least one spatial direction extending transversely to the spindle axis, wherein via the spindle holder the spindle end is displaceably held on the fastening part of the lumbar support or the side-bolster adjuster with respect to two first and second spatial directions extending approximately perpendicularly to each other and each perpendicular to the spindle axis, wherein the adjusting device comprises two spindle drives with one spindle each.

15. The adjusting device according to claim 14, wherein a first spindle cooperates with a spindle nut drivable to perform a rotation about the associated spindle axis, while the other, second spindle is drivable to perform a rotation about its spindle axis and meshes with a non-rotatable spindle nut.

16. The adjusting device according to claim 15, wherein a spindle end of the first, stationary spindle is displaceably held with respect to the two first and second spatial directions extending approximately perpendicularly to each other and each perpendicularly to the spindle axis of the first spindle, and a spindle nut meshing with another, second spindle is displaceable at least along a spatial direction extending perpendicularly to the spindle axis of the second spindle by deforming an elastic compensating element.

17. The adjusting device according to claim 16, wherein the elastic compensating element is sleeve-shaped or ring-shaped.

18. The adjusting device according to claim 14, wherein by means of a first spindle the carrier is shiftable along the guiding device together with the adjusting part and by means of a second spindle the carrier and the adjusting part are shiftable relative to each other.

* * * * *